3,290,366
5-AMINO-N-ALKYL-2,4,6-TRIIODOISOPHTHA-LAMIC ACID DERIVATIVES

George B. Hoey, Ferguson, Mo., assignor to Mallinckrodt Chemical Works, St. Louis, Mo., a corporation of Missouri
No Drawing. Filed Mar. 6, 1963, Ser. No. 263,105
9 Claims. (Cl. 260—518)

This invention relates to iodine containing compounds and more particularly to triiodoisophthalamic acid derivatives.

Briefly the invention is directed to certain dibasic acid derivatives of 5-amino-N-alkyl-2,4,6-triiodoisophthalamic acids.

Among the objects of the invention may be mentioned the provision of novel derivatives of 5-amino-N-alkyl-2,4,6-triiodoisophthalamic acid; the provision of compounds of the type indicated which are derived from dibasic carboxylic acids; the provision of compounds of the type indicated which are useful in the preparation of X-ray contrast media; and the provision of compounds of the type indicated which are suitable for use in intravenous cholangiography. Other objects will be in part apparent and in part pointed out hereinafter.

The invention accordingly comprises the products hereinafter described, the scope of the invention being indicated in the following claims.

The present invention is directed to the novel 5-amino-N-alkyl-2,4,6-triiodoisophthalamic acid derivatives of the general formula:

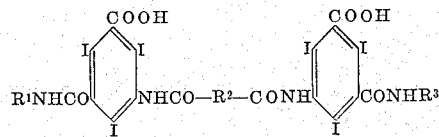

wherein $R^1$ and $R^3$ are lower alkyl radicals and $R^2$ is an alkylene group containing up to 14 carbon atoms or phenylene, and the salts thereof with pharmaceutically acceptable cations.

The novel compounds of the present invention are useful for the preparation of X-ray contrast media, particularly media for use in intravenous cholangiography.

Salts of the acids defined above with pharmaceutically acceptable cations conventionally used in intravenous X-ray contrast agents, such as sodium, N-methylglucamine and diethanolamine salts, are soluble in water. Solutions of said salts may be administered intravenously with a low incidence of side reactions, and when so administered they are excreted rapidly from the system. The higher members of the series are excreted predominantly by the liver through the biliary system and thus serve, by virtue of their relatively high iodine content, to visualize the structures of the biliary system, such as the gall bladder and ducts, when they are irradiated by X-rays by well-known techniques used for the purpose. Lower members of the series are excreted by the kidney to a considerable degree and may be used for visualizing structures of the urinary system. The low toxicity and high salt solubility of several of these compounds makes them susceptible to use as vasographic agents, also.

Dispersions of water insoluble derivatives of these iodinated acids, such as their esters, are also useful, as for example in visualizing hollow organs and cavities having external orifices through which the contrast preparation can be introduced preliminary to the examination and removed after the examination is completed.

In general, the acids of the invention may be prepared by condensing 5-amino-N-alkyl-2,4,6-triiodoisophthalamic acids with a di-acid halide of a dicarboxylic acid, for example, adipoyl chloride.

Methods of preparing the intermediate 5-amino-N-alkyl-2,4,6-triiodoisophthalamic acids are disclosed in Hoey Patent 3,145,197, dated August 18, 1964. A brief outline of one such method follows. 5-nitroisophthalic acid is converted to its dimethyl ester by known methods and one of the ester groups is then selectively hydrolyzed by carefully treating a solution of the diester with one equivalent of sodium or potassium hydroxide in a reaction medium consisting of a mixture of methanol and acetone. The resulting monoester is treated with a primary lower alkyl amine to form the corresponding 5-nitro-N-alkylisophthalamic acid. The nitro group is reduced by catalytic hydrogenation to yield the corresponding 5-amino-N-isophthalamic acid, which is then converted to the corresponding triiodo compound by iodination using iodine monochloride or potassium iododichloride as the iodinating agent. The resulting 5-amino-N-alkyl-2,4,6-triiodoisophthalamic acid, preferably after purification, is suitable for use as a starting material in the preparation of the compounds of the present invention.

The following examples illustrate the invention:

EXAMPLE 1

5,5'-(adipoyldiimino)-bis[2,4,6-triiodo-N-methylisophthalamic acid]

5-amino-2,4,6-triiodo-N-methylisophthalamic acid (228 g., .4 mole) was added to stirred, heated dimethylacetamide (400 ml.). When the temperature reached 95° C., adipoyl chloride (27.5 g., 0.15 mole) was added all at once, followed by an equal amount added slowly over a period of 15 minutes (a total of 55 g.). After addition of the adipoyl chloride the solution was stirred at about 95° C. for another 15 minutes, then poured into 2 liters of hot water.

As the above mixture cooled to room temperature a gum separated. The mother liquor was discarded and the gum was dissolved in water (2 liters) with sufficient sodium hydroxide to complete solution. The solution was acidified with hydrochloric and acetic acids, treated with decolorizing charcoal and filtered. The filtrate was then strongly acidified with hydrochloric acid, which caused the separation of an apparently amorphous granular solid. This was filtered off, digested ½ hour with hot ethanol (500 ml.) collected, washed with ethanol and dried at 110° C. Yield of crude 5,5'-(adipoyldiimino)-bis[2,4,6-triiodo-N-methylisophthalamic acid], 183 g. (neutral equivalent, 618; calculated, 627).

The acid obtained above was precipitated a second and third time from its sodium salt solution. The third precipitate was then dissolved in hot dimethylformamide (400 ml.), and water (1.5 l.) was slowly added. The mixture was digested and the hot mixture filtered, yielding a crystalline product which, after drying at 110° C., weighed 126 g. (neutral equivalent, 724). This product was dissolved in dilute sodium hydroxide solution (1 l.) and the solution was acidified (pH 5) and filtered into a hot stirred solution of hydrochloric acid (25 ml. of concentrated acid in 75 ml. water). The mixture was chilled and the solid collected, washed with water and dried at 110° C. Yield 114 g. (45%). Melting point, 302° C. (corrected), with decomposition. Calculated for $C_{24}H_{20}N_4O_8I_6$: Neutral equivalent, 627; iodine, 60.7%. Found (after correction for 1.18% water): Neutral equivalent, 619; iodine, 60.2%. The infra-red spectrum was in harmony with the postulated structure.

EXAMPLE 2

5,5'-(suberoyldiimino)-bis[2,4,6-triiodo-N-methylisophthalamic acid]

The preparation was carried out in a manner similar to that described in Example 1, using 300 ml. dimethylacetamide, 180 g. (0.314 mole) of 5-amino-2,4,6-triiodo-N-methylisophthalamic acid and 0.23 mole of crude suberoyl chloride. A reaction temperature of 90–105° C. was employed.

The product was isolated and purified in a manner similar to that described in Example 1. The yield of 5,5'-(suberoyldiimino)-bis[2,4,6 - triiodo-N-methylisophthalamic acid] was 69.5 g. (34%). Melting point, 278–280.5° C. (corrected), with decomposition. Calculated for $C_{26}H_{24}N_4O_8I_6$: Neutral equivalent, 641; iodine, 59.4%. Found: Neutral equivalent, 638; iodine, 57.9%. The infra-red spectrum was in harmony with the postulated structure.

EXAMPLE 3

5,5'-(sebacoyldiimino)-bis[2,4,6-triiodo-N-methylisophthalamic acid]

5-amino-2,4,6-triiodo-N-methylisophthalamic acid (580 g., 1 mole) was added in portions with stirring to dimethylformamide (750 ml.) at 70–90° C. When the temperature reached 90° C., sebacoyl chloride (120 g., 0.5 mole) was added and heating was continued until the temperature reached 120° C. Solution was then practically complete. The temperature was maintained at 120° C. for ½ hour, then water (750 ml.) was added. The clear solution was digested at 70–90° C. for 2 hours, during which time the product crystallized. The product was collected and washed with 50% dimethylformamide (200 ml.) and then with water (200 ml.).

The wet product was dissolved in dilute sodium hydroxide solution (3 l.), a few ml. of ammonium hydroxide was added and the solution was heated to 70° C. The solution was made slightly acid (pH 5), decolorizing charcoal was added and the mixture was filtered into hot (70–90° C.) dilute hydrochloric acid (80 ml. of concentrated acid in 2 liters of water). The mixture was digested at 70–90° C. for 1 hour and the product was collected, washed with water and dried at 110° C. Yield, 453 g. (neutral equivalent, 640; calculated, 655).

This product was dissolved in hot dimethylformamide (500 ml.), hot water (500 ml.) was added, and the mixture was digested at 70–80° C. for 1 hour, during which time crystallization occurred. The product was collected and washed, first with 50% dimethylformamide (200 ml.) and then with water (500 ml.). The product was then dissolved in dilute sodium hydroxide solution (3 liters) and the solution was acidified (pH 5) with dilute hydrochloric acid. The solution was treated twice with decolorizing charcoal and then added to hot (70–90° C.) stirred dilute hydrochloric acid (80 ml. concentrated acid in 1 liter of water). The precipitation mixture was allowed to digest for ½ hour after which the product was collected, washed well with water and dried at 110° C. Yield of 5,5'-(sebacoyldiimino)-bis[2,4,6-triiodo-N-methylisophthalamic acid], 353 g. (54%). Melting point, 279–279.5° C. (corrected) with decomposition. Calculated for $C_{28}H_{28}N_4O_8I_6$: Neutral equivalent, 655; iodine, 58.2%. Found: Neutral equivalent, 652; iodine, 57.9%.

EXAMPLE 4

5,5'-(dodecanedioyldiimino)-bis[2,4,6-triiodo-N-methylisophthalamic acid]

Dodecanedioyl chloride was prepared by adding phosphorus pentachloride (62 g., 0.3 mole) in 3 portions to a solution of 1,10-dodecanedicarboxylic acid (25 g., 0.11 mole) in toluene (50 ml.). The reaction mixture was allowed to stand overnight, after which the excess phosphorus pentachloride was removed under reduced pressure, and the residue was vacuum distilled to give 8.7 g. (30%) of dodecanedioyl chloride (boiling point, 169–172° C./3 mm.).

The dodecanedioyl chloride (8.7 g., 0.033 mole) was added to a solution of 5-amino-2,4,6-triiodo-N-methylisophthalamic acid (37.3 g., 0.065 mole) in dimethylformamide (60 ml.) at 121° C. The temperature rose quickly to 135° C. The mixture was stirred and maintained at 120–123° C. for a half hour and then diluted with water (60 ml.). The mixture was digested at 70–80° C. for 2½ hours after which the solid was filtered off, dissolved in sodium hydroxide solution and reprecipitated by the addition of hydrochloric acid, to yield 31.6 g. of product with neutral equivalent 616.5 (calculated, 669). This product was purified by four recrystallizations from 50:50 dimethylformamide/water, each recrystallization being followed by precipitation of the acid from a solution of its sodium salt. Yield of 5,5'-(dodecanedioyldiimino)-bis[2,4,6-triiodo-N-methylisophthalamic acid], 14.3 g. (33%). Calculated for $C_{30}H_{32}I_6N_4O_8$: Neutral equivalent, 669; iodine, 56.95%. Found: Neutral equivalent, 666; iodine, 55.8%. Melting point, 288 C. (with decomposition). The infra-red spectrum was in harmony with the postulated structure.

EXAMPLE 5

5,5'-(suberoyldiimino)-bis[2,4,6-triiodo-N-propylisophthalamic acid]

The necessary intermediates were prepared by methods similar to those disclosed in Hoey patent 3,145,197, dated August 18, 1964.

(A) 5-NITRO-N-PROPYLISOPHTHALAMIC ACID n-Propylamine (100 g., 1.70 mole) was added to a solution of methyl hydrogen 5-nitroisophthalate (153 g., 0.68 mole) in methanol (700 ml.). The container was tightly closed and the reaction mixture set aside for 4 days.

At the end of this time the solvent was evaporated and the remaining oil was dissolved in dilute sodium hydroxide solution (1.5 liters). The solution was made slightly acid (pH 5–6) and the resulting solution was slowly added to a stirred excess of dilute hydrochloric acid (80 ml. concentrated acid in 400 ml. of water). The product was collected and twice reprecipitated by acidifying a solution of the sodium salt. This product was recrystallized from 50% ethanol (500 ml.), washed and dried at 110° C. Yield of 5-nitro-N-propylisophthalamic acid, 98 g. (57.5%). Melting point, 181.1–184.1° C. (corrected). Neutral equivalent, 247 (calculated, 252). The infra-red spectrum was in harmony with the postulated structure.

(B) 5-AMINO-N-PROPYLISOPHTHALAMIC ACID

An alcoholic solution of 5-nitro-N-propylisophthalamic acid (80 g., 0.32 mole) was hydrogenated in the presence of a Pd/C catalyst. The catalyst was filtered off and the solvent evaporated. The residue was dissolved in dilute sodium hydroxide solution and the product precipitated by the addition of an excess of acid. The product was collected, washed with water and dried at 70° C. Yield of 5-amino-N-propylisophthalamic acid, 42 g. (59%). Melting point, 194.7–195.7° C. (corrected). The infra-red spectrum was in harmony with the postulated structure.

(C) 5-AMINO-2,4,6-TRIIODO-N-PROPYLISOPHTHALAMIC ACID

Iodine monochloride (160.5 g. of 95% ICl in 160 ml. of concentrated hydrochloric acid) was slowly added to a stirred mixture of 5-amino-N-propylisophthalamic acid (42 g., 0.19 mole) and dilute hydrochloric acid (45 ml. concentrated hydrochloric acid in 400 ml. water). Sufficient water was added to bring the volume to about 1350 ml. and the mixture was stirred and heated on a steam bath for 20 hours.

The reaction mixture was cooled and the product collected and dissolved in a solution of sodium hydroxide (40 g. of 50% NaOH in 500 ml. water). The solution was acidified slightly (pH 5) with acetic acid, treated with decolorizing charcoal and filtered into hot stirred dilute hydrochloric acid (50 ml. concentrated acid in 150 ml. water). The mixture was chilled and the crystals collected, washed with water and dried at 70° C. Yield of 5-amino-2,4,6-triiodo-N-propylisophthalamic acid, 109 g. (96%). Melting point, 242–243° C. (corrected), with decomposition. Neutral equivalent, 594 (calculated 600). The infra-red spectrum was in harmony with the postulated structure.

(D) 5,5'-(SUBEROYLDIIMINO)-BIS[2,4,6-TRIIODO-N-PROPYLISOPHTHALAMIC ACID]

Suberoyl chloride (18.8 g., 0.09 mole) was added to a solution of 5-amino-2,4,6-triiodo-N-propylisophthalamic acid (107.5 g., 0.18 mole) in dimethylformamide (160 ml.) at 122° C. The temperature rose immediately to 136.5° C. and HCl was vigorously evolved. The mixture was heated at 128° C. for 2 hours after which water (160 ml.) was added. A gummy material separated which eventually turned to a semi-solid when the product was cooled and the beaker scratched. The liquid was decanted and the residue dissolved in sodium hydroxide solution and reprecipitated by the addition of an excess of hydrochloric acid. This product was purified by re-crystallizing it 3 times from a 1:1 dimethylformamide/water mixture followed by a precipitation accomplished by acidifying an aqueous solution of the sodium salt. Yield of 5,5'-(suberoyldiimino)-bis[2,4,6-triiodo-N-propylisophthalamic acid], 71 g. (60%). Melting point, 286.5° C., with decomposition. Calculated for

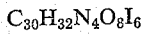

$C_{30}H_{32}N_4O_8I_6$

Neutral equivalent, 669; iodine, 56.9%. Found: Neutral equivalent, 671; iodine, 55.7%. The infra-red spectrum was in harmony with the postulated structure.

EXAMPLE 6

*5,5'-(sebacoyldiimino)-bis[2,4,6-triiodo-N-propylisophthalamic acid]*

The preparation was carried out in a manner similar to that described in Example 1, using 100 ml. dimethylacetamide, 65 g. (0.108 mole) of 5-amino-2,4,6-triiodo-N-propylisophthalamic acid, 13 g. (0.054 mole) of sebacoyl chloride and a reaction temperature of 90–105° C.

The product was isolated and purified in a manner similar to that described in Example 1, but included a precipitation of the ammonium salt in addition. The yield of 5,5'-(sebacoyldiimino)-bis[2,4,6-triiodo-N-propylisophthalamic acid] was 26.2 g. (35%). Melting point, 286–286.5° C. (corrected) with decomposition. Calculated for $C_{32}H_{36}N_4O_8I_6$: Neutral equivalent, 683; iodine, 55.7%. Found: Neutral equivalent, 682; iodine, 54.6%. The infra-red spectrum was in harmony with the postulated structure.

EXAMPLE 7

*5,5'-(sebacoyldiimino)-bis[N-butyl-2,4,6-triiodoisophthalamic acid]*

The necessary intermediates were prepared by methods similar to those disclosed in Hoey Patent 3,145,197, dated August 18, 1964.

(A) N-BUTYL-5-NITROISOPHTHALAMIC ACID

A solution of methyl hydrogen 5-nitroisophthalate (225 g., 1 mole) and n-butylamine (250 ml.) in absolute methanol (1 liter) was heated under reflux for 16 hours.

The solvent was evaporated, leaving an oil, which was dissolved in dilute aqueous sodium hydroxide. The product was precipitated by the addition of an excess of hydrochloric acid and this treatment was repeated twice more with little improvement in quality. Neutral equivalent, 187 (calculated, 266).

Finally, the product was dissolved in hot acetone (1 liter). The solution was filtered and an equal volume of water was added. The solvents were slowly evaporated and when the concentrated solution was cooled the product separated. The crystals were collected, washed with water and dried at 110° C. Yield of n-butyl-5-nitroisophthalamic acid, 103 g. (39%). Calculated for $C_{12}H_{14}N_2O_6$: Neutral equivalent, 266. Found: Neutral equivalent, 268.

A similar preparation yielded a product of neutral equivalent, 263 and melting point, 174.2–175.2° C. (corrected).

(B) 5-AMINO-N-BUTYLISOPHTHALAMIC ACID

A solution of n-butyl-5-nitroisophthalamic acid (103 g., 0.39 mole) in ethanol (400 ml.) was hydrogenated in the presence of a Pd/C catalyst. The catalyst was removed by filtration and the solvent by evaporation. Yield of 5-amino-N-butylisophthalamic acid, 86 g. (94%). Melting point, 199.2–199.7° C. (corrected). The infra-red spectrum was in harmony with the postulated structure.

(C) 5-AMINO-N-BUTYL-2,4,6-TRIIODOISO-PHTHALAMIC ACID

A solution of iodine monochloride (205 g. of 95% ICl in 205 ml. concentrated hydrochloric acid) was added slowly to a stirred slurry of 5-amino-N-butylisophthalamic acid (86 g., 0.36 mole), water (800 ml.) and concentrated hydrochloric acid (89 ml.). The mixture was diluted to a volume of about 2650 ml. and stirred and heated on a steam bath for about 20 hours.

The reaction mixture was chilled and the separated solid was collected and washed with water. It was then dissolved in dilute sodium hydroxide solution (1300 ml.) which was then acidified slightly (ph 5) by means of acetic acid. The solution was treated with sodium bisulfite, then wtih decolorizing charcoal, and filtered into a hot, stirred hydrochloric acid solution (40 ml. concentrated acid in 200 ml. water). The mixture was chilled and the separated solid was collected. This treatment was repeated, yielding 192 g. (86%) of 5-amino-N-butyl-2,4,6-triiodoisophthalamic acid. Melting point, 247–249° C. (corrected), with decomposition. Calculated for $C_{12}H_{13}N_2O_3I_3$: Neutral equivalent 614. Found: Neutral equivalent, 606. The infra-red spectrum was in harmony with the postulated structure.

(D) 5,5'-(SEBACOYLDIIMINO)-BIS[N-BUTYL-2,4,6-TRIIODOISOPHTHALAMIC ACID]

Sebacoyl chloride (19.5 g., 0.0815 mole) was added dropwise to a solution of 5-amino-N-butyl-2,4,6-triiodoisophthalamic acid (100 g., 0.163 mole) in dimethylformamide (200 ml.) at 90° C. When the solution temperature reached 100° C. heating was discontinued and the reaction mixture allowed to cool slowly to room temperature. Water, 550 ml. was added, and the product separated as a gum.

The product was isolated and purified in a manner similar to that described in Example 1. Yield of 5,5'-(sebacoyldiimino)-bis[N-butyl-2,4,6-triiodoisophthalamic acid], 29.7 g. (26%). Melting point, 269.5–271° C. (corrected), with decomposition. Calculated for

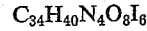

$C_{34}H_{40}N_4O_8I_6$

Neutral equivalent, 697; iodine, 54.7%. Found: Neutral equivalent, 708; iodine, 53.7%. The infra-red spectrum was in harmony with the postulated structure.

EXAMPLE 8

5,5'(Terephthaloyldiimino)-bis[2,4,6-triiodo-N-methylisophthalamic acid]

Terephthaloyl chloride (10.15 g., 0.05 mole) was added to a solution of 5-amino-2,4,6-triiodo-N-methylisophthalamic acid (57.2 g., 0.1 mole) in dimethylacetamide (150 ml.) at a temperature of 102° C. The temperature rose spontaneously to 106° C. The solution was then heated at 115–118° C. for 2 hours, then 150 ml. of water was added. The mixture was cooled in an ice water bath and the separated crystals removed by filtration. The product was washed with acetone and purified by recrystallization from 50% aqueous dimethylacetamide. The product was dissolved in dilute sodium hydroxide and reprecipitated by the addition of excess hydrochloric acid. Yield of 5,5'-(terephthaloyldiimino)-bis[2,4,6-triiodo-N-methylisophthalamic acid], 10.9 g. (17.1%). Melting point, 316–320° C. (corrected), with decomposition. Calculated for $C_{26}H_{16}N_4O_8I_6$: Neutral equivalent, 637; iodine, 59.8%. Found: Neutral equivalent, 649 (after correction for 3.54% water); iodine, 58.6% (corrected). The infra-red spectrum was in harmony with the postulated structure.

Acute intravenous toxicity determinations were carried out in mice using aqueous solutions of the di-N-methylglucamine salts of the acids disclosed in the preceding examples. The results, as well as solubility data for the disodium salts of a number of the acids, are shown in Table I.

are considered the media of choice for intravenous visualization of the gall bladder and ducts. Such preparations are marketed under the trademarks Cholografin and Biligrafin. The disodium and di-N-methylglucamine salts of iodipamide are soluble in water to the extent of about 17% and about 45% (w./v.), respectively, at 25° C. [Dorn, H., Pharmazie 12, 321 (1957)].

In contrast to these values, the greater solubility of the disodium salts of the acids of the invention will be evident from the last column of Table I. The di-N-methylglucamine salts of these acids are even more soluble than the sodium salts, the methylglucamine salt of the acid of Example 3 being soluble to the extent of over 100 g./100 ml., for example. The greater water solubility of such salts of this invention makes possible the administration of adequate doses of the radioopaque substance in modest volumes of solution.

Even more important is the lower degree of toxicity of the compounds of this invention as compared with somewhat similar compounds of the prior art. In addition to the $LD_{50}$ data set forth in Table I, supplementary pharmacological data on the compound of Example 3, 5,5'-(sebacoyldiimino) - bis[2,4,6 - triiodo - N - methylisophthalamic acid], also indicate the superior properties of the compounds of the present invention over comparable compounds of the prior art.

Comparative toxicity studies of the di-N-methylglucamine salt of the compound of Example 3 and the di-N-methylglucamine salt of iodipamide were carried out with the results outlined in Table 2.

TABLE 1

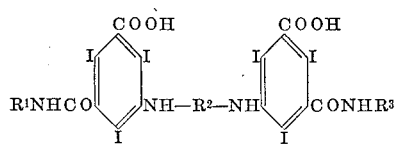

| Examples | $R^1$, $R^3$ | $R^2$ | $LD_{50}$ (mice) g./kg. | Solubility of Disodium Salt (g./100 ml. solution, 25° C.) |
|---|---|---|---|---|
| 1 | $CH_3$ | $-CO(CH_2)_4CO-$ | 14–16.5 | 71 |
| 2 | $CH_3$ | $-CO(CH_2)_6CO-$ | 19.5 | |
| 3 | $CH_3$ | $-CO(CH_2)_8CO-$ | 13.1 | 47 |
| 4 | $CH_3$ | $-CO(CH_2)_{10}CO-$ | 4.8 | 50 |
| 5 | $CH_3CH_2CH_2-$ | $-CH(CH_2)_9CO-$ | 8.4 | >93 |
| 6 | $CH_3CH_2CH_2-$ | $-CO(CH_2)_8CO-$ | 3.5 | |
| 7 | $CH_3(CH_2)_3-$ | $-CO(CH_2)_8CO-$ | 2.3 | |
| 8 | $CH_3-$ | $-CO-\langle\rangle-CO-$ | 10.3 | |

Salts of the acids of this invention with cations normally used in X-ray contrast media are substantially more water soluble than comparable compounds of somewhat similar structure disclosed in the prior art which have achieved substantial commercial success. For example, preparations of the compound 3,3'-(adipoyldiimino)-bis[2,4,6-triiodobenzoic acid], also known as iodipamide, whose structure may be represented as follows:

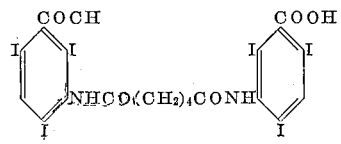

TABLE 2

| Study | 5,5'-(sebacoyldiimino)-bis[2,4,6-triiodo-N-methylisophthalamic acid] NMG (75%), mg./kg. | Iodipamide NMG (52%), mg./kg. |
|---|---|---|
| $LD_{50}$: | | |
| Mice | 13,100 | 4,100 |
| Rats | 6,600 | *3,400 |
| Dogs | >10,000 | |
| Intracerebral $LD_{50}$: Mice | 1,120 | 62.1 |

*Dorn, Pharmazie, 12, 321 (1957).

Damage to the blood brain barrier in laboratory animals has been suggested as a meaningful index of local tissue toxicity. When tested by a modification of the technique described by Whiteleather and De Saussure (Radiology, 67:537–43, 1956), damage to the blood brain barrier of the dog from the administration of a solution of the di-N-methylglucamine salt of the compound of Example 3 was markedly less than that due to a comparable solution of iodipamide N-methylglucamine.

Other pharmacological effects of the compound of Example 3 compare favorably with those of iodipamide.

Intravenous cholangiographic studies were carried out in cats, using aqueous solutions of the di-N-methylglucamine salts of the acids disclosed in the examples. Gall bladder visualization was achieved in all instances, and in most instances it compared favorably with that achieved with iodipamide.

A 75% solution of the di-N-methylglucamine salt of the compound of Example 3 was used in clinical studies for intravenous visualization of the gall bladder. Good visualization of the gall bladder, as well as of the ducts, was achieved. In many instances as opacification progresses, the wall of the gall bladder becomes visible, followed by the remainder of the organ. No side reactions were observed.

In view of the above, it will be seen that the several objects of the invention are achieved and other advantageous results obtained.

As various changes could be made in the above products without departing from the scope of the invention, it is intended that all matter contained in the above description shall be interpreted as illustrative and not in a limiting sense.

What is claimed is:

1. A compound selected from compounds of the formula:

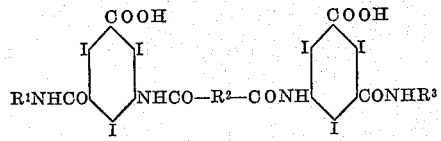

wherein $R^1$ and $R^3$ are lower alkyl radicals and $R^2$ is an alkylene radical containing not more than 14 carbon atoms or phenylene, and the salts thereof with pharmaceutically acceptable cations.

2. A compound selected from the group which consists of 5,5' - (adipoyldiimino) - bis[2,4,6 - triiodo - N - methylisophthalmic acid], and the salts thereof with pharmaceutically acceptable cations.

3. A compound selected from the group which consists of 5,5' - (suberoyldiimino) - bis[2,4,6 - triiodo - N-methylisophthalamic acid], and the salts thereof with pharmaceutically acceptable cations.

4. A compound selected from the group which consists of 5,5' - (sebacoyldiimino) - bis[2,4,6 - triiodo - N-methylisophthalamic acid], and the salts thereof with pharmaceutically acceptable cations.

5. A compound selected from the group which consists of 5,5' - (dodecanedioyldiimino) - bis[2,4,6 - triiodo-N-methylisophthalamic acid], and the salts thereof with pharmaceutically acceptable cations.

6. A compound selected from the group which consists of 5,5' - (suberoyldiimino) - bis[2,4,6 - triiodo - N-propylisophthalamic acid], and the salts thereof with pharmaceutically acceptable cations.

7. A compound selected from the group which consists of 5,5' - (sebacoyldiimino) - bis[2,4,6 - triiodo - N-propylisophthalamic acid], and the salts thereof with pharmaceutically acceptable cations.

8. A compound selected from the group which consists of 5,5' - (sebacoyldiimino) - bis[N - butyl - 2,4,6 - triiodoisophthalamic acid], and the salts thereof with pharmaceutically acceptable cations.

9. A compound selected from the group which consists of 5,5' - (terephthaloyldiimino) - bis[2,4,6 - triiodo-N-methylisophthalamic acid], and the salts thereof with pharmaceutically acceptable cations.

References Cited by the Examiner

UNITED STATES PATENTS 2,776,241  1/1957  Priewe et al. _____ 260—518

FOREIGN PATENTS 785,670  10/1957  Great Britain.

LORRAINE A. WEINBERGER, *Primary Examiner.*

DANIEL D. HORWITZ, *Examiner.*

A. THAXTON, *Assistant Examiner.*